US009573776B2

(12) United States Patent
Wiemers

(10) Patent No.: US 9,573,776 B2
(45) Date of Patent: Feb. 21, 2017

(54) APPARATUS AND METHODS FOR ENTRAINING A SUBSTANCE IN A FLUID STREAM

(71) Applicant: Rockwater Resource, LLC, Denver, CO (US)

(72) Inventor: Reginald A. Wiemers, Littleton, CO (US)

(73) Assignee: Rockwater Resource, LLC, Denver, CO (US)

( * ) Notice: Subject to any disclaimer, the term of this patent is extended or adjusted under 35 U.S.C. 154(b) by 136 days.

(21) Appl. No.: 14/544,239

(22) Filed: Dec. 12, 2014

(65) Prior Publication Data

US 2016/0167897 A1 Jun. 16, 2016

(51) Int. Cl.
*B65G 53/40* (2006.01)
*B65G 53/26* (2006.01)
*B65G 53/34* (2006.01)

(52) U.S. Cl.
CPC ............... *B65G 53/26* (2013.01); *B65G 53/34* (2013.01)

(58) Field of Classification Search
CPC .......... B65G 53/26; B65G 53/34; B65G 53/40
USPC .................... 406/75, 108, 151–153; 222/547
See application file for complete search history.

(56) References Cited

U.S. PATENT DOCUMENTS 1,880,452 A * 10/1932 Hulslander ......... B29C 37/0071 406/132
3,624,967 A * 12/1971 Kamper et al. ......... B24C 3/065 451/2
3,638,839 A * 2/1972 Weightman ........... B24C 7/0053 406/85
4,411,388 A * 10/1983 Muck .................... B05B 7/1486 239/419.5
5,071,289 A 12/1991 Spivak
5,171,090 A 12/1992 Wiemers
5,232,314 A * 8/1993 Hopkins ................ B65G 53/58 406/153
5,366,560 A * 11/1994 Rubey, III ................ B08B 7/00 134/42
5,947,800 A * 9/1999 Fring .................... B24C 7/0046 451/101
6,200,071 B1 * 3/2001 Karasawa ............ B65G 53/521 406/193
7,524,233 B1 * 4/2009 Reilley ..................... B24C 5/04 451/38
2001/0003351 A1 6/2001 Chen et al.
2003/0173289 A1 9/2003 Schoenbrunn et al.
2005/0058020 A1 3/2005 Lott
2005/0111298 A1 5/2005 Lott
2006/0157131 A1 7/2006 Harris et al.
2011/0287170 A1 11/2011 Colclough, Jr. et al.

* cited by examiner

*Primary Examiner* — William R Harp
(74) *Attorney, Agent, or Firm* — Harold A. Burdick

(57) ABSTRACT

Apparatus and methods are disclosed for uptake and transport of particulate matter in a gas stream. The apparatus includes a receiver for the particulate matter connected with a gravity feed input channel assembly with a passive metering orifice therein. An in-line aeration and distribution chamber assembly is connected with an outlet from the input channel assembly and includes a chamber with plural discrete gas intake passageways opening thereinto. An outlet channel exits the chamber and is connectable with a vacuum suction source for directing a gas stream having the particulate matter entrained therein from the apparatus.

18 Claims, 13 Drawing Sheets

APPARATUS AND METHODS FOR ENTRAINING A SUBSTANCE IN A FLUID STREAM

FIELD OF THE INVENTION

Figure 1:
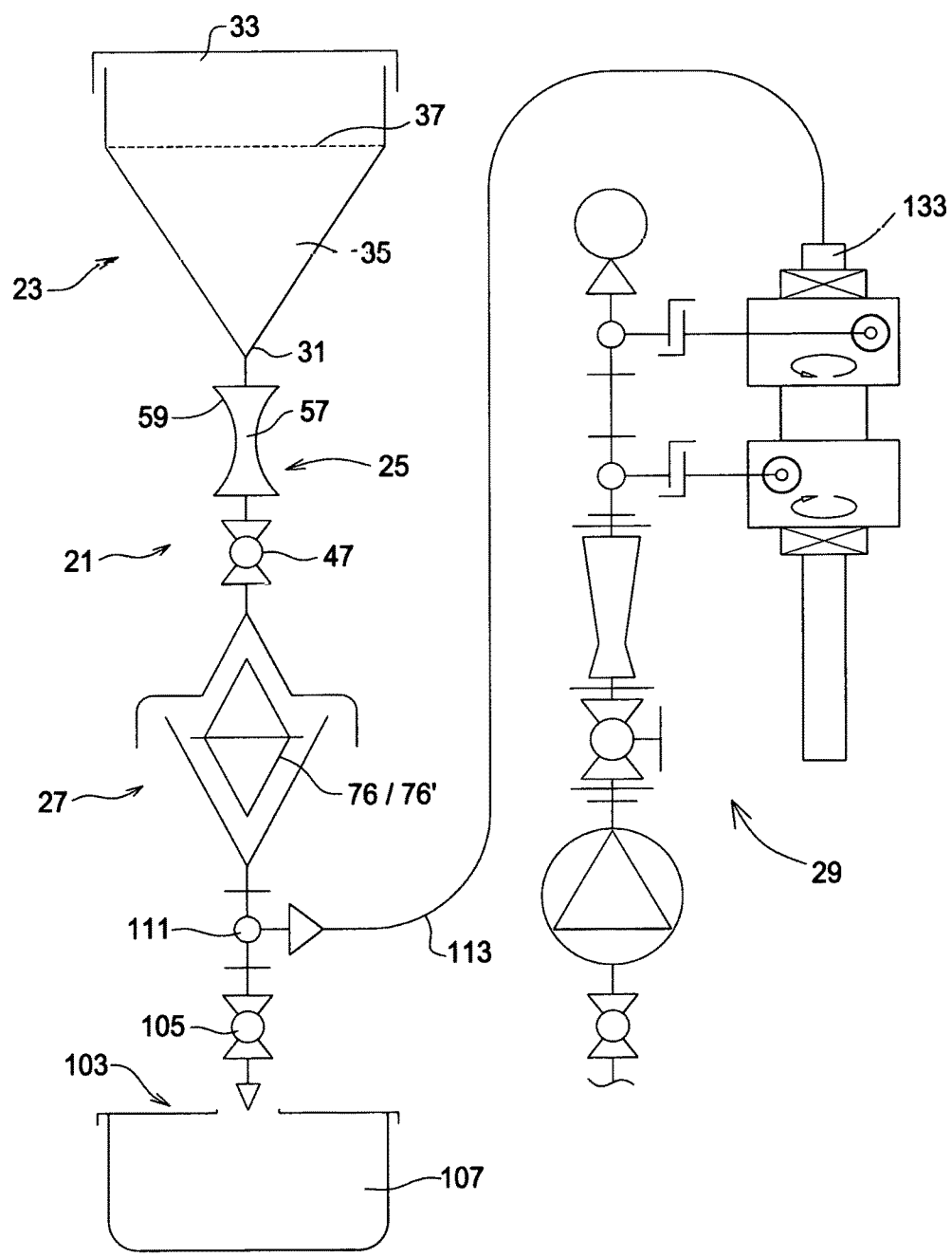

This invention relates to apparatus and methods for educting substances and, more particularly, relates to such apparatus and methods for educting dry particulate substances for subsequent dispersion in solution.

BACKGROUND OF THE INVENTION

Various dry material dispersers have heretofore been utilized in various industrial mixing applications (see U.S. Pat. Nos. 5,071,289 and 5,171,090, and U.S. Patent Application Publication Nos. 2005/0111298 and 2005/0058020). Such devices are typically designed to accommodate particular dry materials and operations, thus lacking adaptability to various other operations or dry materials.

For example, polymer materials used in flocculation processing of liquids may be provided in a variety of shapes and sizes (for example, in bead/pellet form, dust form or crystal form). Moreover, processing may demand various feed and material mass flow rate distribution for successful makeup. One example is current fast oilfield drilling operations, where high throughput rate polymer make-up would be quite desirable for existing closed loop solids control flocculation operations in order to keep pace with modern drilling rigs' high rate of penetration. For industrial applications, furthermore, polymer make-up systems must be durable and, particularly for outdoor operations such as oilfield applications, simple to operate and maintain, with as few component and moving parts as possible Heretofore, however, high rate polymer make-up systems have included mechanically complex auger conveying systems comprising a feeder bin, chain driven conveyor screw, bearings, gearbox, motor, agitation paddles, bin vibrator, safety screen, speed control, complex electrical circuits and switches, and separate dry polymer eductor(s) and dispersal/wetting system. These systems have not proven altogether useful, particularly for oilfield and other remote construction site applications, having been characterized in such application by higher down time, life cycle cost and maintenance frequencies.

SUMMARY OF THE INVENTION

This invention provides apparatus and methods for entraining substances such as dry particulate material in a fluid stream (air or other gas, for example). The apparatus is adaptable for a variety of dry material shapes and sizes and to various material feed and mass flow rate distributions. The apparatus is durable and simple to assemble, use and maintain, and has few or no moving or movable parts.

The apparatus of this invention is connectable with a vacuum suction source for entraining substances in the fluid stream and includes a receiver having a discharge structure (a funnel structure for example) for loading the substance. A gravity feed input channel assembly receives the discharge structure at one end thereof and has an opposite end therebelow. The channel assembly includes a metering orifice therein.

A distribution assembly receives the opposite end of the input channel assembly and has a fluid intake. An outlet channel connects with the vacuum suction source for directing a fluid stream having the substance entrained therein from the apparatus. The distribution assembly includes a particulate matter intake channel terminating at a chamber having plural discrete gas intake passageways opening thereinto adjacent to the intake channel.

The method for entraining a substance in a fluid stream includes the steps of utilizing gravity to selectively meter the substance into a chamber having plural fluid intake passageways thereinto. A cyclonic disperser dry material inlet is utilized to establish a vacuum suction source, a fluid stream through the passageways and the chamber established by applying the vacuum suction source at the chamber. The substance is entrained in the fluid stream through discrete selectively configured mass transfer openings at the chamber, the entrained substance provided at the dry material inlet of the disperser. Selected mass flow rate distribution and/or different substance characteristics are selectively accommodated by the selective metering and the selective configuration of mass transfer openings.

The apparatus and methods of the present invention are preferably employed to provide continuous mixing of air with a separate particulate material to form an airstream with suspended solids. These arrangements provide an economical and operatively simple means for inline educting of dry particulates at selectable mass flow rates in makeup of suspensions, with predictable specific particulate concentration in a liquid. Passive motionless inline metering provides continuous control for a specific particulate mass flow. Interchangeable metering inserts and aeration/distribution inserts are preferably provided to meet on-site conditions.

This invention is thus utilizable in makeup of polymer solution with a selectable, specific polymer concentration strength at a selectable specific makeup rate to provide a manually and/or automatically controllable flocculation process and, more specifically, for rugged oilfield applications such as closed loop solids control. The conveying airflow may be generated by the vacuum of a venturi action cyclonic disperser used for dispensing the particulate stream in a liquid.

It is therefore an object of this invention to provide apparatus and methods for entraining substances such as dry particulate material in a fluid stream.

It is another object of this invention to provide apparatus and methods for entraining substances in a fluid stream that are adaptable for a variety of dry material shapes and sizes and to various material feed and mass flow rate distributions.

It is still another object of this invention to provide apparatus for entraining substances in a fluid stream that are durable and simple to assemble, use and maintain, It is yet another object of this invention to provide apparatus for entraining substances in a fluid stream that have few or no moving or movable parts.

It is another object of this invention to provide an apparatus connectable with a vacuum suction source for entraining a substance in a fluid stream that includes a receiver for the substance having a discharge structure, a gravity feed substance input channel assembly receiving the receiver discharge structure at one end and having an opposite end therebelow, the assembly including a metering orifice therein, and a distribution assembly receiving the opposite end of the input channel assembly and having a fluid intake and an outlet channel connectable with the vacuum suction source for directing a fluid stream having the substance entrained therein from the apparatus.

It is still another object of this invention to provide an apparatus connectable with a vacuum suction source for entraining particulate matter in a gas stream that has a receiver for the particulate matter having an outlet, a particulate matter input channel assembly receiving the receiver outlet at one end and having an opposite end, the assembly including a metering orifice therein, and an aeration and distribution chamber assembly receiving the opposite end of the input channel assembly at a particulate matter intake channel terminating at a chamber defined in the chamber assembly, plural discrete gas intake passageways opening into the chamber adjacent to the intake channel, and an outlet channel exiting the chamber and connectable with the vacuum suction source for directing a gas stream having the particulate matter entrained therein from the apparatus.

It is yet another object of this invention to provide a method for entraining a substance in a fluid stream that includes the steps of utilizing gravity to meter the substance into a chamber having plural fluid intake passageways thereinto, utilizing a cyclonic disperser dry material inlet to establish a vacuum suction source, establishing a fluid stream through the passageways and the chamber by applying the vacuum suction source at the chamber, entraining the substance in the fluid stream through discrete selectively configured mass transfer openings at the chamber, and providing the entrained substance at the dry material inlet of the disperser, whereby at least one of selected mass flow rate distribution and different substance characteristics is selectively accommodated by the selective metering and the selective configuration of mass transfer openings.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a diagrammatic illustration of a first preferred embodiment of this invention;

FIG. 2 is a partial sectional view of the apparatus of this invention illustrated in FIG. 1;

FIG. 3 is another partial sectional view of the apparatus shown in FIG. 2 showing additional optional features;

FIG. 4 is a partial top view illustration of the apparatus of FIG. 3;

FIG. 5 is a partial bottom view illustration of the apparatus of FIG. 3;

FIGS. 6*a* and 6*b* are perspective views of two illustrative types of metering orifice inserts deployable in the apparatus of this invention;

FIG. 7 is a sectional view showing the insert of FIG. 6*b* deployed in the hopper/funnel adapter of the apparatus of FIG. 2;

FIGS. 8*a*, 8*b* and 8*c* are sectional views of two illustrative arrangements of aeration and distribution chamber assemblies for the apparatus of this invention;

FIGS. 9*a* and 9*b* are top views of illustrative distribution inserts selectively deployed with the assemblies of FIGS. 8*a* and 8*b*, respectively;

FIG. 10 is a diagrammatic illustration of a second preferred embodiment of this invention;

FIG. 11 is a partial sectional view of the apparatus of this invention illustrated in FIG. 10;

FIG. 12 is a partial sectional view showing the insert of FIG. 6*b* deployed in the ball port of the loading control valve of the apparatus of FIG. 11;

FIG. 13 is a diagrammatic illustration of a third preferred embodiment of this invention;

FIG. 14 is a partial sectional view of the apparatus of this invention illustrated in FIG. 13; and FIG. 15 is a sectional view illustrating adaptation of features of the apparatus of FIG. 14.

DESCRIPTION OF THE INVENTION

First preferred embodiment 21 of the apparatus of this invention, including a receiver 23, input channel assembly 25 and distribution assembly 27, is illustrated in FIGS. 1 through 9 (numbers indicating elements common to all embodiments of this invention are utilized in all of the FIGURES). In all embodiments of this invention a vacuum suction source 29 provides the motive airstream through distribution assembly 27 of the apparatus (as shown in the FIGURES, a cyclonic disperser of the type taught in U.S. Pat. No. 5,171,090, for example).

The terms "substance", "dry substance", "particulate matter" and/or "particulate material" and the like all refer to granular, bead, pellet, crystallized or powdered materials or other pressure transportable or fluidizable dry materials.

Receiver 23 includes discharge structure (or outlet) 31 at the bottom thereof and is typically filled with particulate matter to be entrained at top 33 (establishing funnel structure 35 below sizing screen 37). Input channel assembly 25 (preferably a vertical input to output oriented gravity feed structure) includes receiver (funnel) adapter 41 and funnel adapter guide 43 at input end 45, and optional input control valve 47 (preferably a ball valve having a ball port 49 in ball 50 maintained in sealed housing 51, and including control arm 52) at opposite output end 53.

Valve 47 is preferably closed only in an empty bulk polymer conveying situation where no dry solid substance is flowing through the apparatus. The valve must be opened when bulk particulate matter needs to be conveyed, calibrated or dumped. For light duty apparatus of this invention, a four bolt polypropylene ball valve is suitable, such as those made by BANJO CO. or others. For heavy duty applications (oilfield applications, for example), four bolt stainless steel ball valves are preferred to prevent or minimize scoring of the ball by the abrasion causing bulk polymers. Stainless ball valves are available from TRIAC CORP. and others.

In this embodiment of the invention, passive metering orifice 57 is located in insert 59 at channel assembly 25, with an outside diameter selected to closely but slidably fit in receiver adapter 41 and rest on shoulder 61 therein (see FIG. 7). In either case, the hourglass design of insert 59 of FIG. 6*a* or 6*b* with orifice 57 formed (drilled or otherwise) at its pinched center provides passive metering adapted to different selected sizes/shapes of particulate material at different mass flow rates through the orifice to accommodate particulate material specific desired mass flow rates and to achieve a repeatable constant make-up solution concentration strength (for example, a polymer solution with selected percentage dry polymer concentration by weight).

FIG. 6*a* shows an ideally shaped orifice insert 59 configuration (pinched center of the dual directional operating hourglass insert with its axis symmetrical orifice configuration—shaped close to a hyperboloid configuration), while FIG. 6*b* shows a more practical and economical orifice insert configuration. Plural removable/interchangeable metering orifice inserts may be provided, each having at least one feature different from the other insert or inserts (for example, orifice size or shape, conical slope, or the like) and thus adapted to use with different physical characteristics of a selected metered substance or to provide different metering outcomes. It should be appreciated that many alternative configurations for inserts 59 could be conceive of for various specific applications.

In either orifice/insert configuration, both incoming and the outgoing cones preferably have identical geometrical configurations. While not requiring axis symmetrical orifice opening configurations, for the sake of user-friendliness, ease of operation, and avoidance of installation/exchange errors in the field axis symmetrical orifice inserts are preferred. Experimentation has shown that a double cone configuration produced with a relative shallow machining angle of tan α/2=23° formed in a cylindrical virgin Teflon insert, having an orifice produced with a letter Z (0.4130") drill provides accurate test results when used with bead form dry bulk polymer:

Weighted dry bulk polymer mass: $M_P$=5 lbs.
Arithmetic average eductor apparatus run time: $t_P$=1.989 min
Make-up water density: $D_{H2O}$=8.34 lbs/gal
Disperser H$_2$O flow rate: $\dot{V}_{H2O}$=85 gal/min
Mass flow H$_2$O:
$\dot{M}_{H2O}=D_{H2O} \times \dot{V}_{H2O}$=8.34 lbs/gal×85 gal/min=708.9 lbs/min
Mass Flow Polymer:

$$\dot{M}_P = \frac{M_P}{t_P} = \frac{5 \text{ lbs}}{1.989 \text{ min}} = 2.5138 \frac{\text{lbs}}{\text{min}}$$

Polymer Make-Up Concentration % by Weight $C_{PM-U}$%:

$$C_{PM-U} = \frac{\dot{M}_P[\text{lbs/min}] \times 100\%}{\dot{M}_{H2O}[\text{lbs/min}]} = \frac{2.5138 \times 100}{708.9} = 0.354, \text{ say } \underline{0.35\%}$$

Note: Other dry bulk polymers may differ and may require different orifice diameters and different machining angles.

Distribution channel assembly 27 includes coupling adapter guide 65 received over particulate matter input channel coupling tube 67, both received at opposite end 53 of input channel assembly 25. Coupling tube 67 is received in aeration and distribution chamber 68/68'/68" at intake channel 69 in upper aeration chamber section 71 (see FIG. 8). Lower aeration chamber section 73 has outlet channel 75 formed therein, sections 73 and 75 together maintaining distribution insert 76/76'/76" therebetween. Coupling outer housing 77 holds the components of distribution chamber 68/68'/68" together.

Figure 8A:
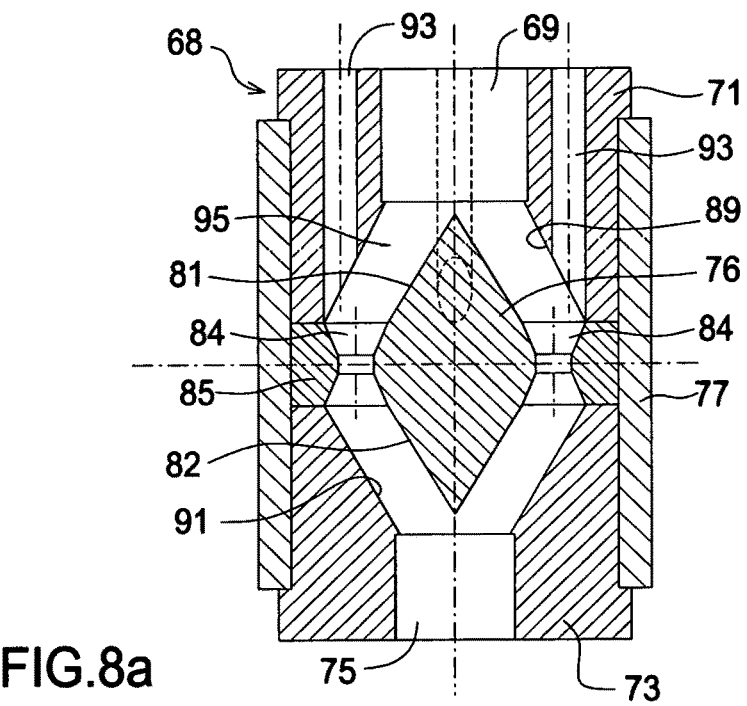
Figure 8B:
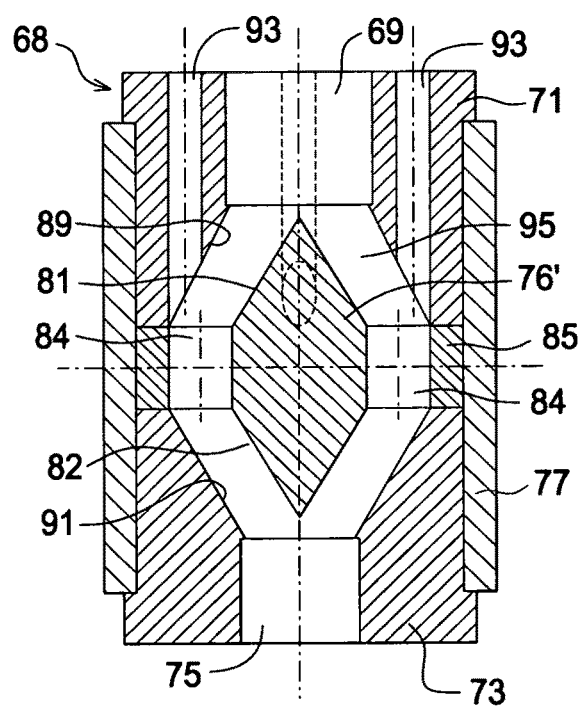
Figure 8C:
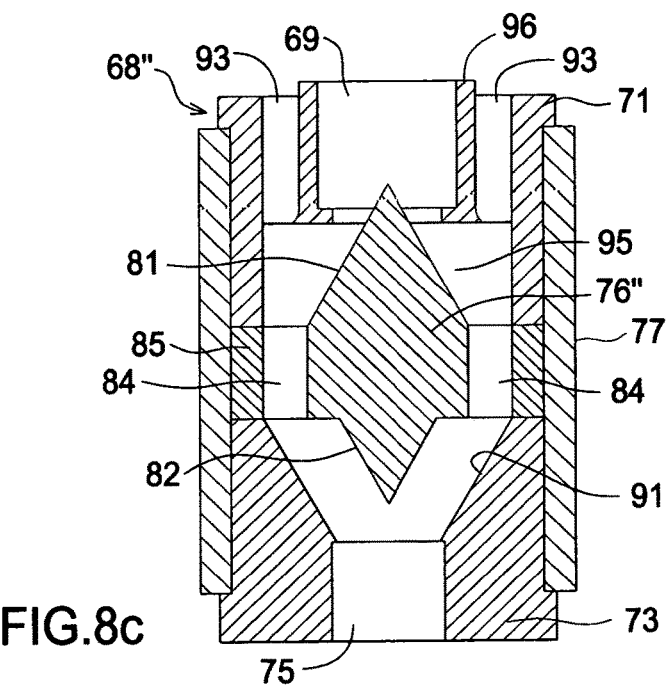
Figure 9A:
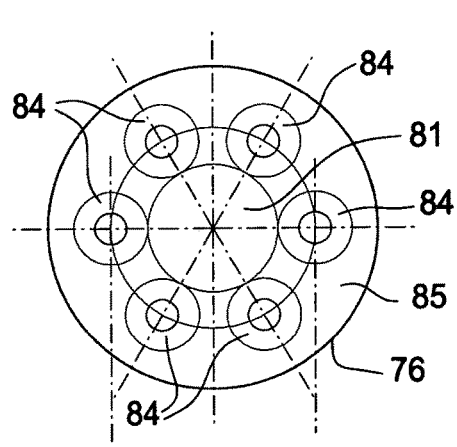
Figure 9B:
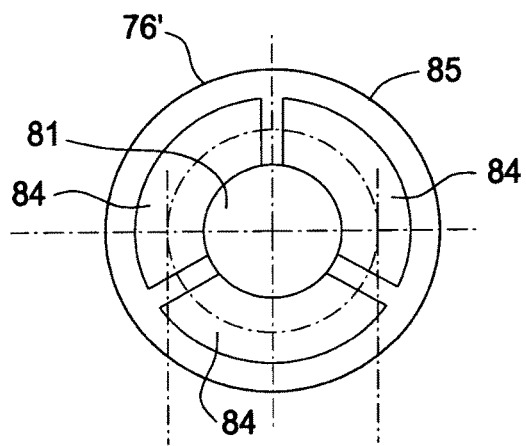

FIGS. 8a, 8b and 8c each show a cross-sectional view taken through the centerline of different embodiments of the aeration and distribution chamber. Low mass flow distribution insert 76 and high mass flow distribution inserts 76'/76" each include back to back conical structures 81 and 82 and plural discrete mass transfer openings 84 at outer circumference 85 thereof (at the adjacent bases of each cone). As seen in FIGS. 8a, 8b, 8c, 9a and 9b, the cones' angles of repose and the number and shape of transfer openings (preferably at least three or more) are differently configured for different exchangeable inserts to accommodate at least one of selected mass flow rate distributions and different particulate materials (only two examples of the many possible configurations are shown, it being understood that others are readily conceivable for various applications or as the need is recognized).

Also shown in FIGS. 8a, 8b and 8c upper aeration chamber section 71 and lower aeration chamber section 73 define upper and lower conical sections 89 and 91, respectively. Plural discrete gas intake passageways 93 open from the ambient into chamber 95 adjacent to intake channel 69 (and may be of selective size and/or quantity to accommodate desired gas flow). The chamber inlets of passageways 93 are preferably located circumferentially around the base of conical section 89 with channel 69 entering conical section 89 concentrically. Alternatively, upper chamber section 71 can be configured cylindrically, with the chamber inlets of passageways 93 opening circumferentially around intake channel 69.

In the embodiment of upper aeration chamber section 71 shown in FIG. 8c a simplified design is provided wherein chamber 95 includes no conical section 89 but is instead roughly toroidal in configuration. This embodiment may be employed where gassing out of particles is less critical (for example, in outdoor installations). In addition, neck 96 extends a selected length above the top surface of chamber section 71, thus integrating a spacing function into chamber section 71 rather than providing a separate spacer as discussed below.

Upper conical section 89 is effective for distribution of the particulate mass flow towards the concentric circumferentially located mass transfer openings 84 to distribute the particulate matter over a large surface area thus to be entrained into a vacuum induced airstream without causing air locking. Insert top conical structure 81 helps to avoid channeling of the particulate material directly into lower conical section 91 without proper aeration, thus avoiding potential slugging and air locking at various output stages. Lower conical section 91 accommodates gradual increase of the particulate bulk material density within the conveying vacuum airstream.

Gas intake shroud 97 is in communication with intake passageways 93 and is located concentrically on intake channel coupling tube 67 between guide 65 and a selected one or ones of interchangeable differently configured intake spacers 99. Spacers 99 are located around tube 67 adjacent to shroud 97 to provide a gas stream of selected characteristics through the chamber assembly by spacing selection between the top of upper chamber section 71 and the inner top of shroud 97. In the case of embodiment 8c of upper aeration chamber section 71, neck 96 serves this function.

Optional calibration and dump features 103 may be utilized with many configurations of the apparatus. When used, features 103 include ball valve 105 (similar to valve 47) and dump tank 107. Outlet channel 75 receives vacuum suction and entrained fluid stream outlet conduit 109 therein. Conduit 109 in this embodiment is received at tee fitting 111 in communication with both calibration and dump valve 105 and, via umbilical vacuum lift tube 113, vacuum suction source (disperser) 29.

Figure 11:
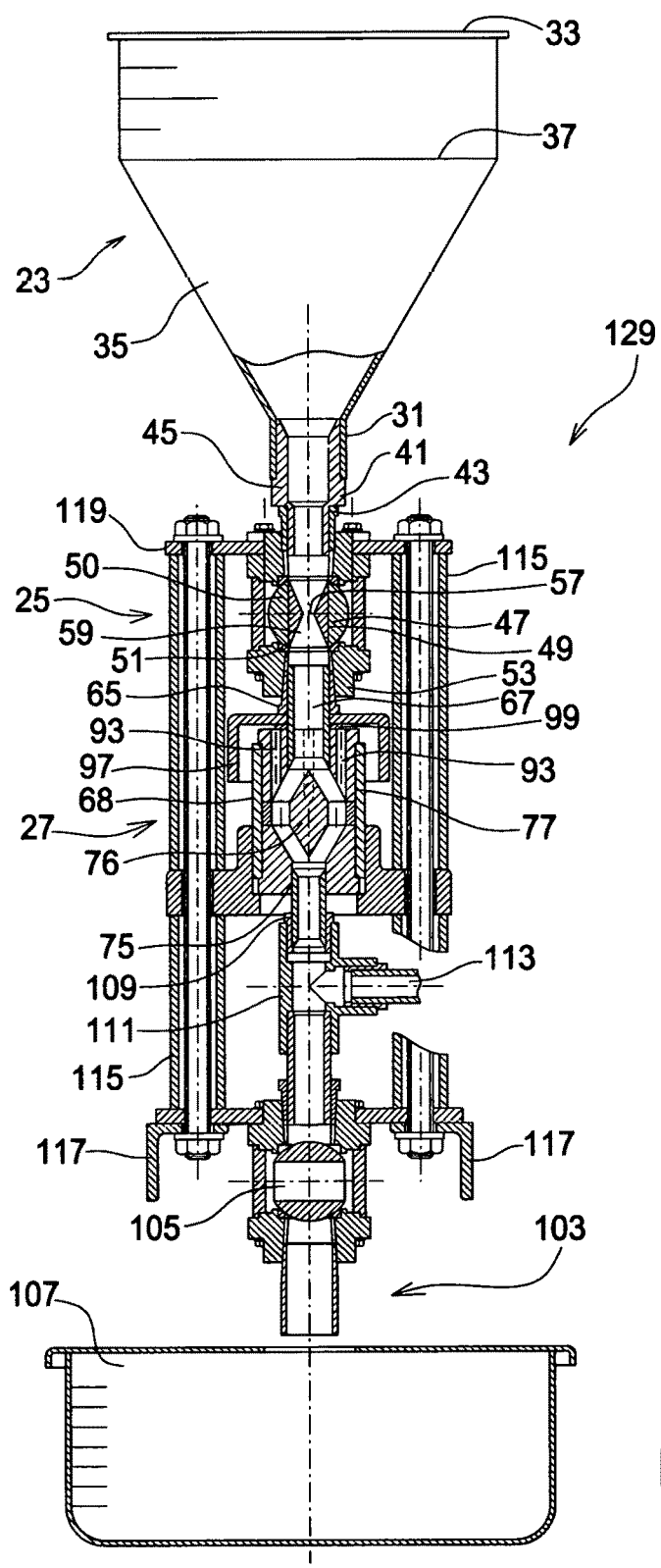
Figure 15:
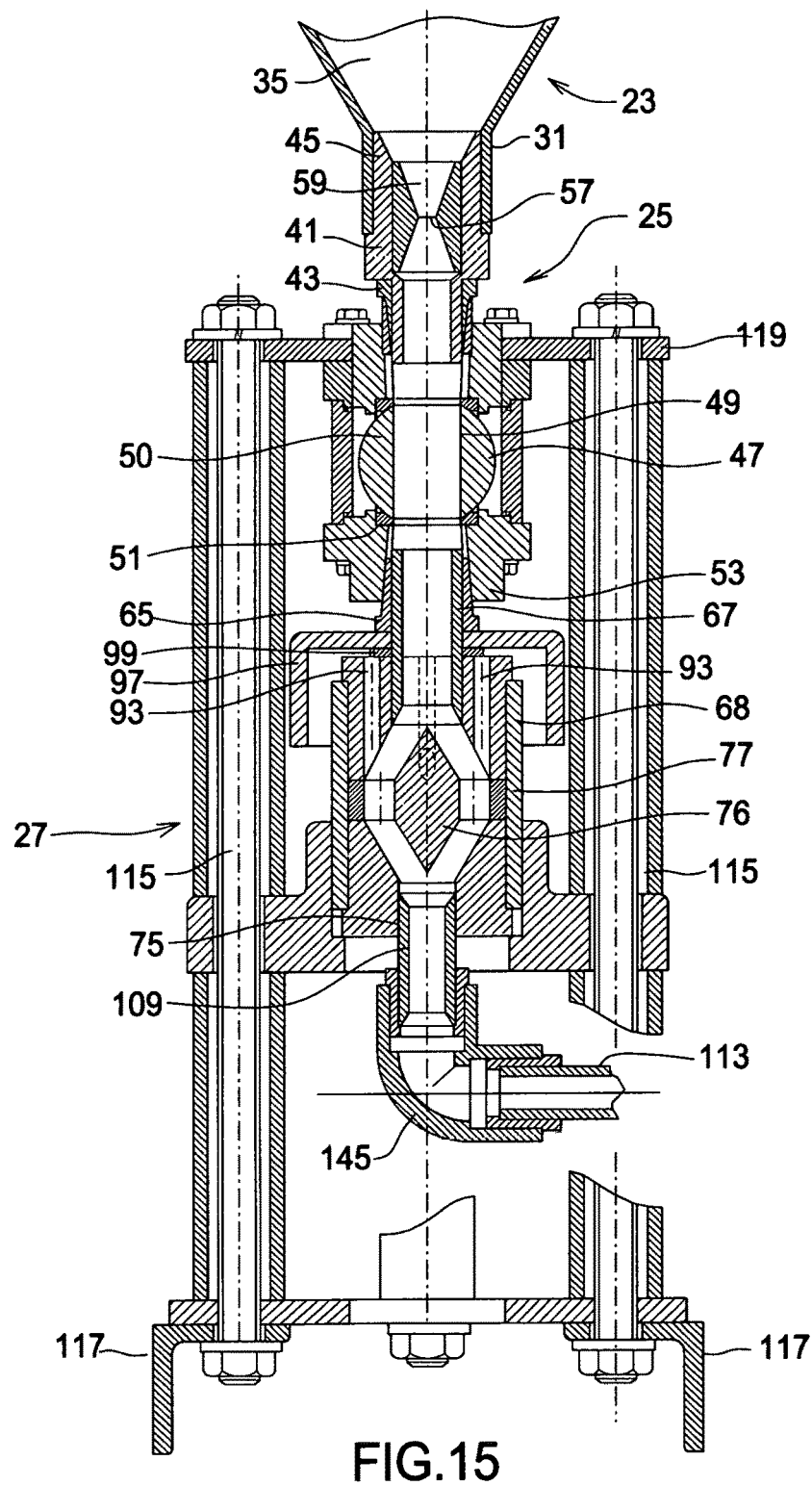

The apparatus, in the case of this embodiment 21 as well as those shown in FIGS. 11 and 15, includes a framework for the assemblies. The framework may take any form appropriate to the apparatus, the task and the particular work site. By way of example, the framework may include an o-frame including legs 115 engaged (using nut, threaded rod and sleeve structures) at base mounting angles 117 and upper yoke assembly 119. Using similar hardware, lower distribution assembly receiving flange 121 and base plate 123 are affixed, base plate 123 and flange 121 also secured to each other at legs assemblies 125.

To accommodate even bulk polymer discharge regularity and continuity and to avoid bridging of polymer particles, many of the embodiments may benefit from use of optional vibrator 129 and vibrator controller 131 mounted using standard angle 132 or spacer/clic-type mounting. An electromagnetic vibrator, such as a DYNA-MITE vibrator model 9000.1 and voltage controller model 9150 from Automation Devices, Inc. are appropriate for oilfield bulk polymer particulate applications and are preferably operationally applied adjacent to insert 59 and/or valve 47.

Figure 12:
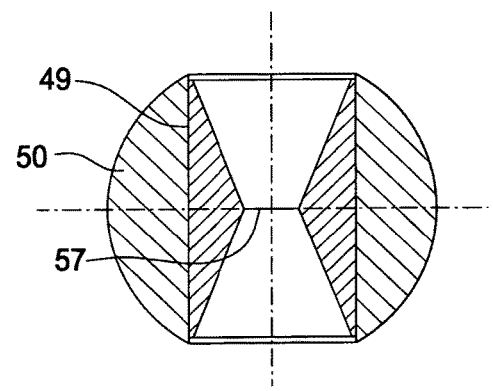
Figure 10:
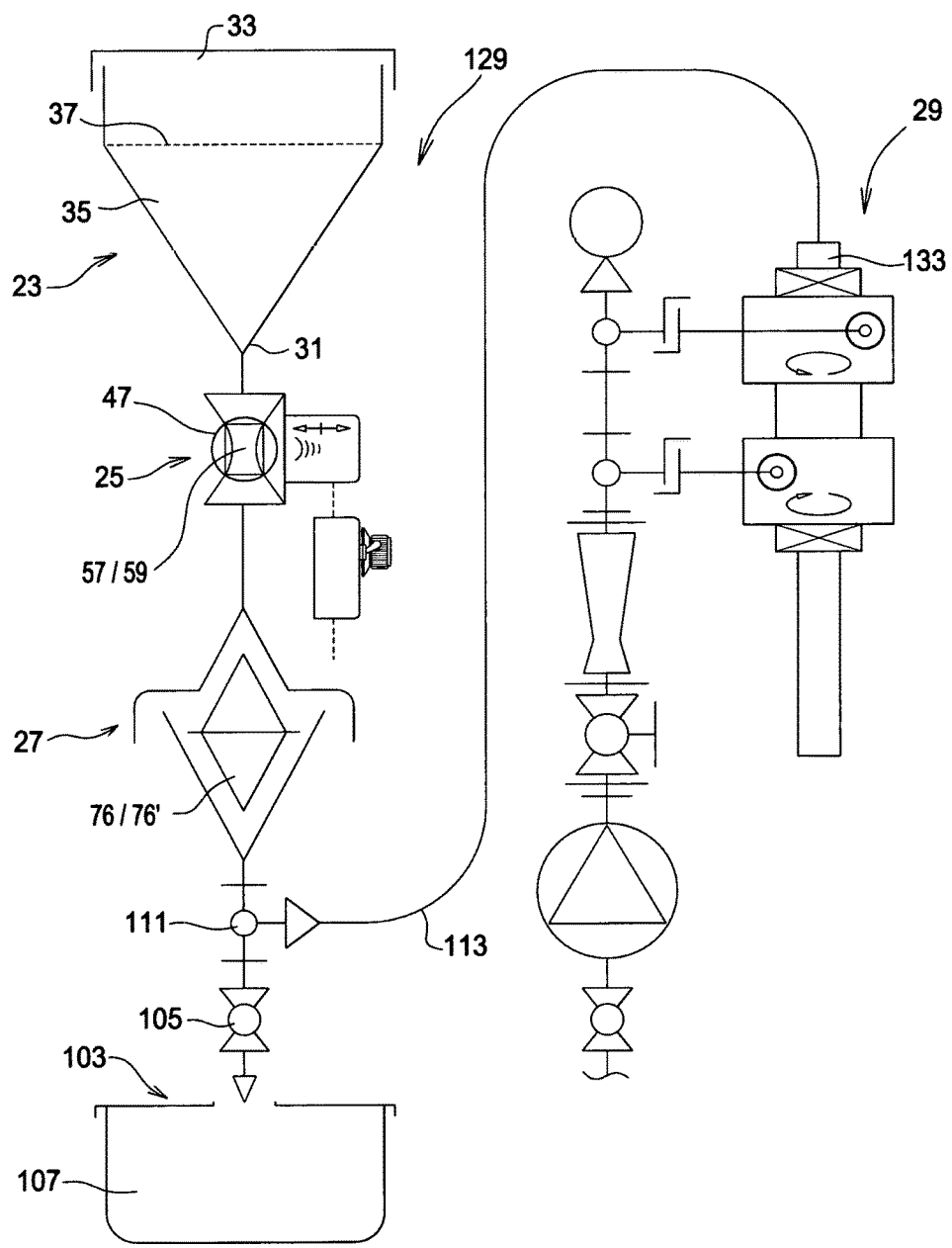

Turning now to FIGS. 10, 11 and 12, a second preferred embodiment 129 of the apparatus of this invention is shown wherein metering insert 59 is press fit into ball port 49 through ball 50 of optional valve 47. As before, differing inserts 59 can be provided for interchangeability on site.

Figure 13:
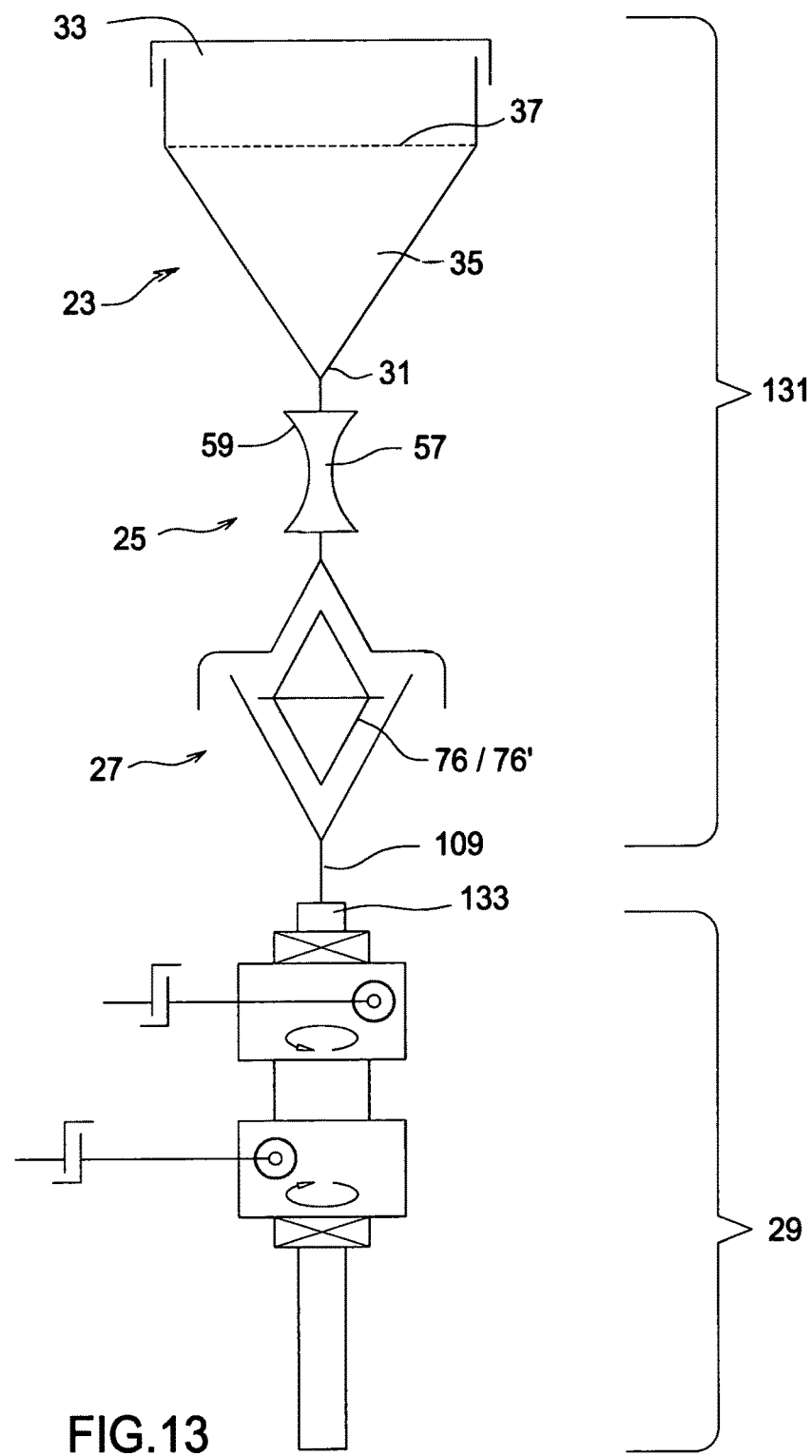
Figure 14:
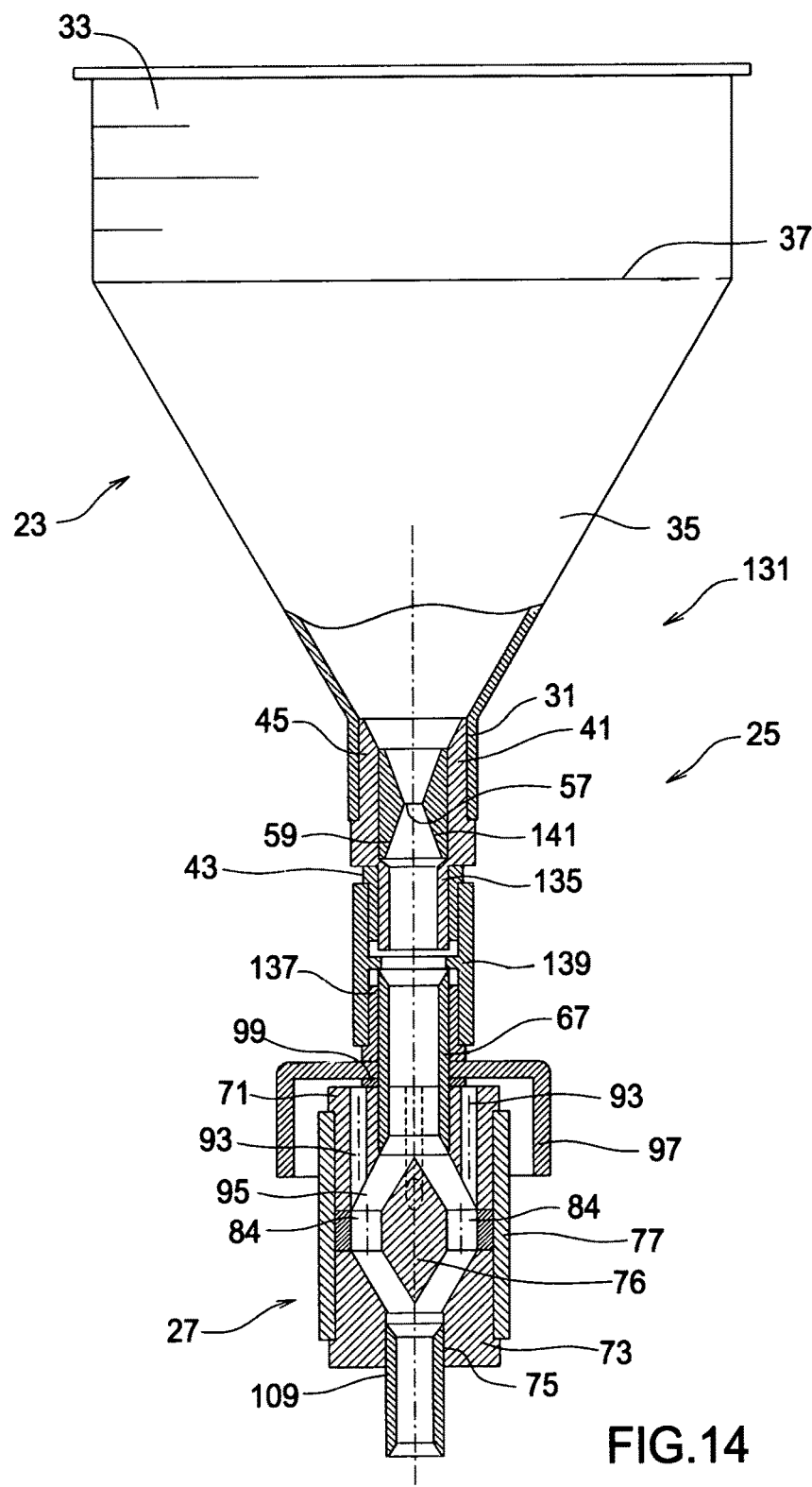

FIGS. 13 and 14 show yet another preferred embodiment 131 of the apparatus of this invention for closed coupled inline self-supporting assemblage with a vacuum suction source/cyclonic disperser 29. No valve 47 is provided and outlet conduit 109 is directly received at suction throat 133 of disperser 29 by means of a slip on conduit type connector. The lower part 135 of receiver adapter 41 is directly connected with distribution channel assembly 27 coupling tube 67 using guide adapter 43 and coupling adapter 137 and coupling connector 139 thereby establishing a throughput channel 141 from receiver 23 to distribution assembly 27 with metering insert 59 therebetween.

FIG. 15 shows one of the many possible examples of an alternative configuration for the variety of features of the apparatus of this invention wherein outlet conduit 109 is connected to elbow 145 and thus directly connected with lift tube 113.

In operation, as may be appreciated, gravity feed is used for selectively metering the substance into chamber 68/68'/68" having plural fluid intake passageways 93 thereinto. Cyclonic disperser 29 dry material inlet (suction throat 133, for example) is used to establish a vacuum suction source for establishing a fluid stream through the passageways and the chamber by applying the vacuum suction source at the chamber. The particulate substance is thus entrained in the fluid stream through the discrete selectively configured mass transfer openings 84 at chamber 68/68'/68". The thus entrained substance is thereby provided at the dry material inlet 133 of the disperser, whereby selected mass flow rate distribution and/or different substance characteristics are selectively accommodated by the selective metering and the selective configuration of mass transfer openings.

In a preferred application, the apparatus' operating medium is screen classified bulk polymer. Receiver sizing screen 37 is adapted to the material. Metering accommodates different dry polymer mass flow rates for different types of dry polymer forms and different desired apparatus discharge rates for the specific polymer make-up solution concentration percentage by weight. The bulk polymer discharge moves through the metering orifice into the inline aeration and distribution chamber 68/68'/68". Continuous airflow to maintain the motive vacuum suction lift is generated by the disperser to convey the dry polymer particles suspended within an airstream into the suction throat of the disperser, thus maintaining smooth vacuum lift continuity, minimizing uneven dry polymer accumulation in the lift tube, and avoiding slugging of the disperser throat with polymer. Lift tube 113 is preferably no longer than 60", flexible, and clear to accommodate operator observations.

Disperser 29 as illustrated can be configured to establish a hydrodynamic shear zone generated through the cyclonic action in the clockwise and counter clockwise rotational fluid meeting zone, thus providing high hydrodynamic shear energy transfer for efficient initial uniform pre-wetting of polymer particles.

Figure 2:
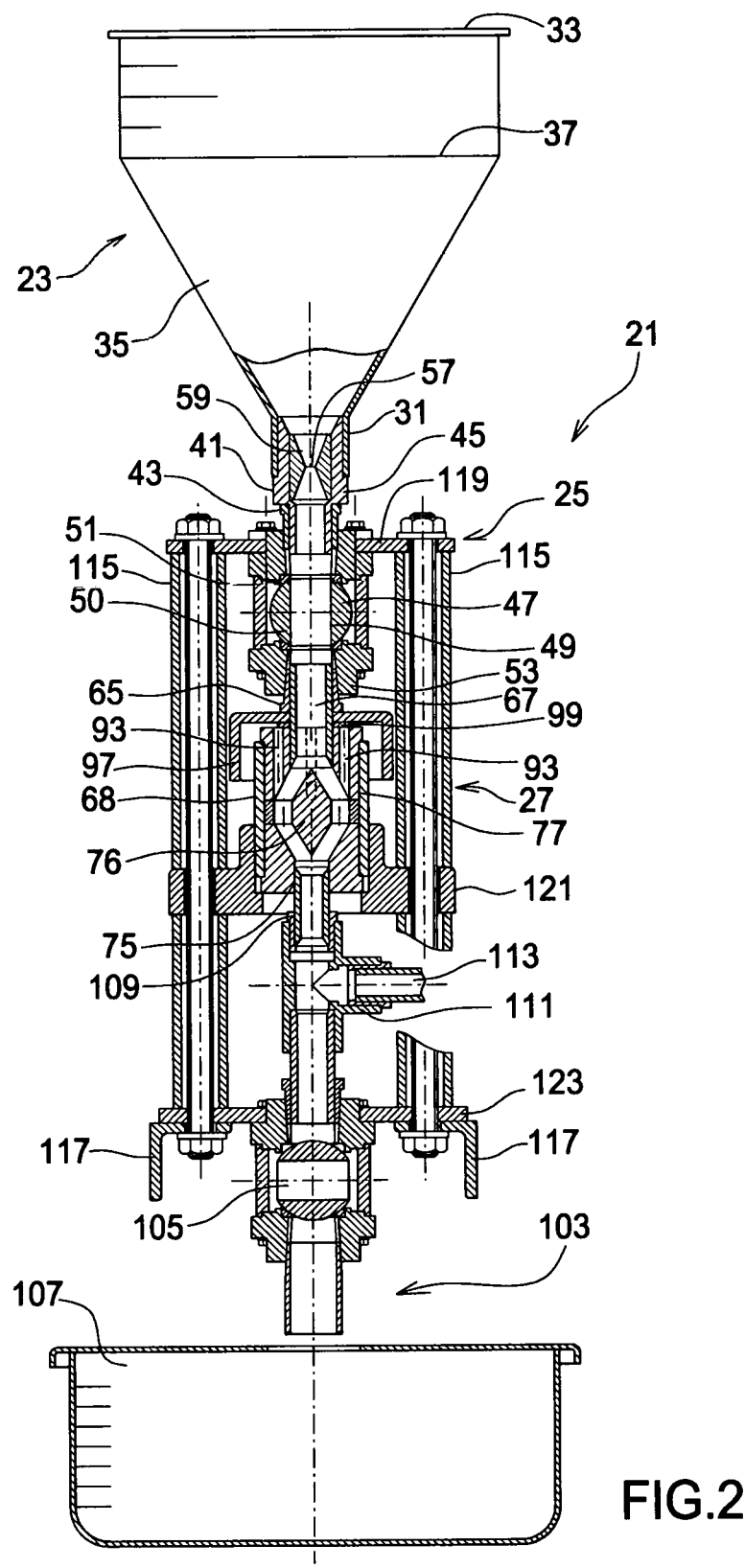
Figure 3:
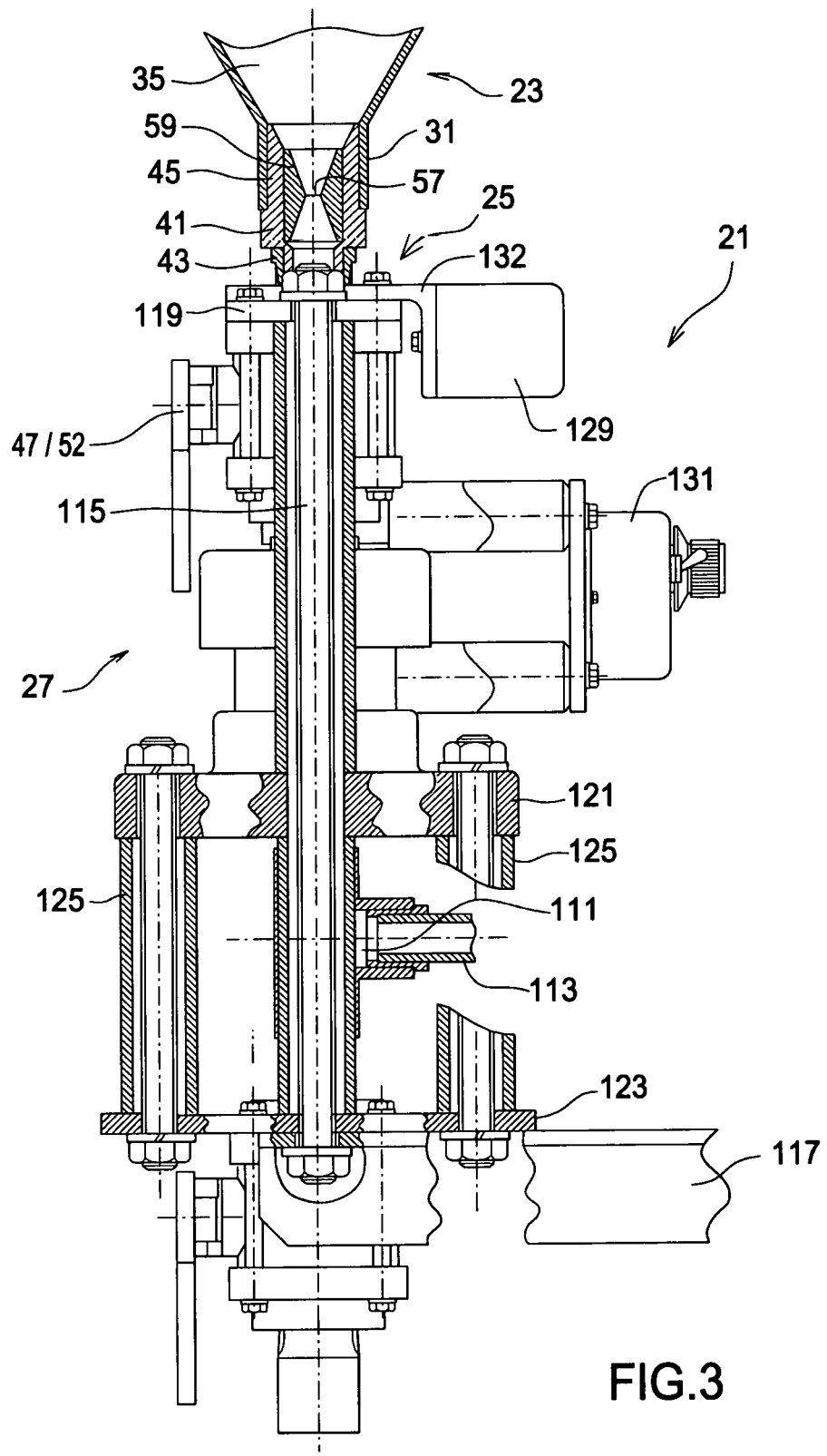
Figure 4:
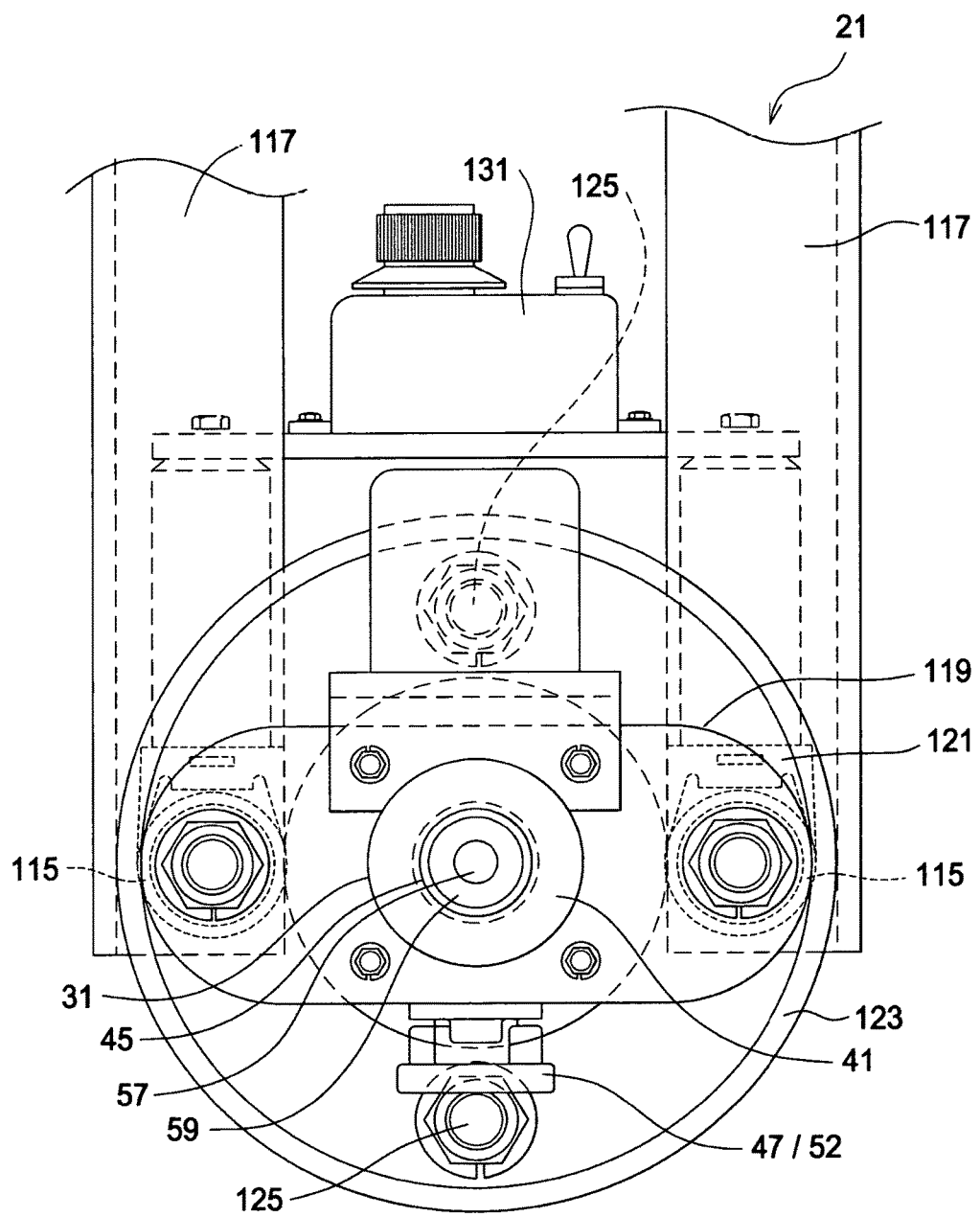
Figure 5:
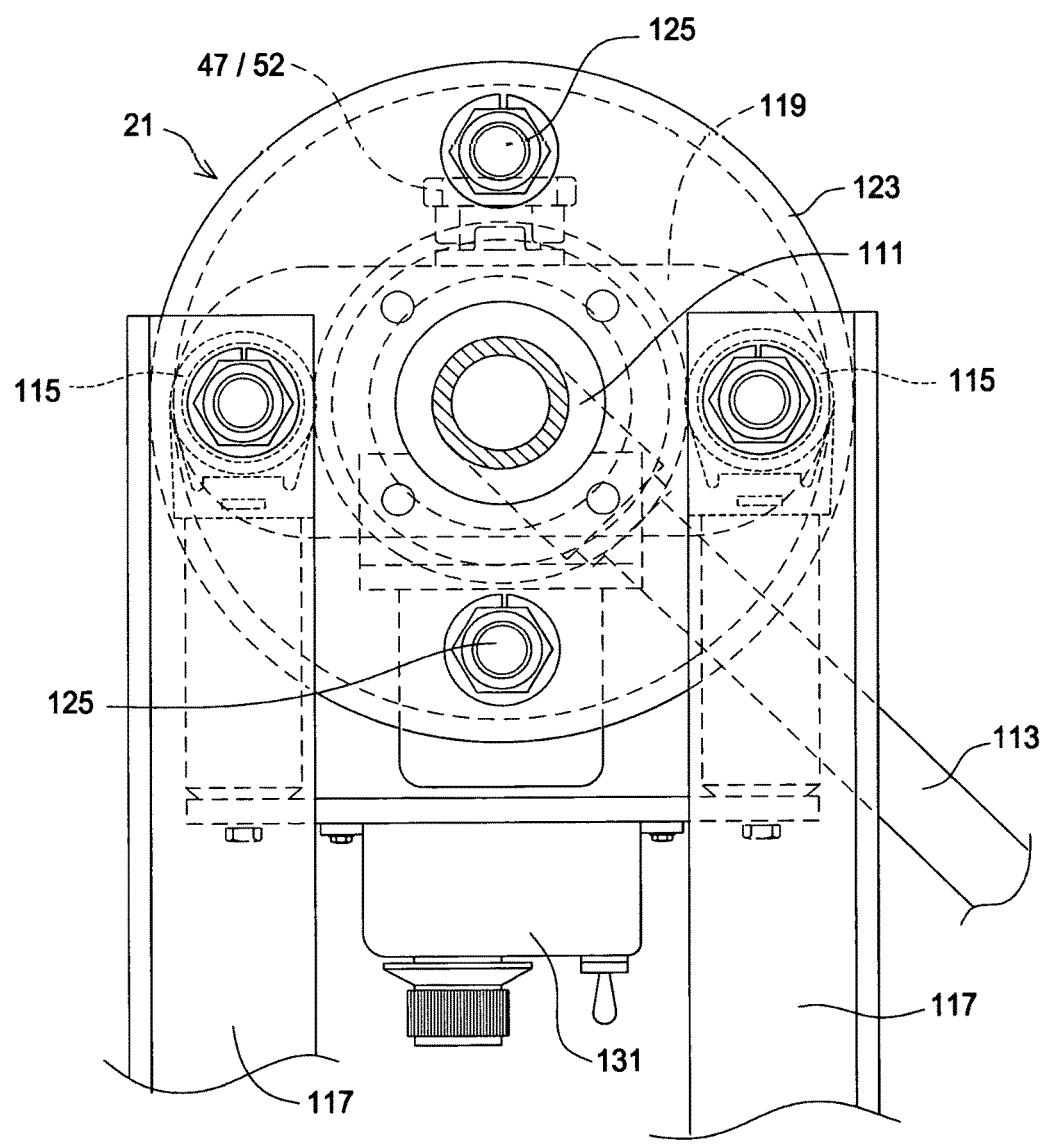
Figure 6A:
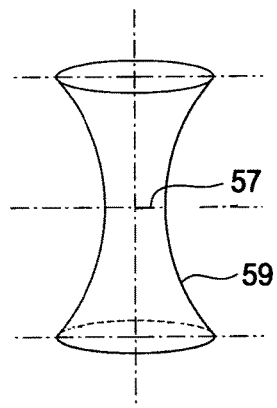
Figure 6B:
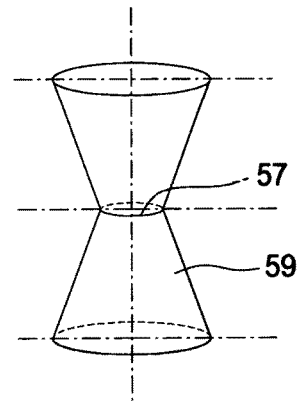
Figure 7:
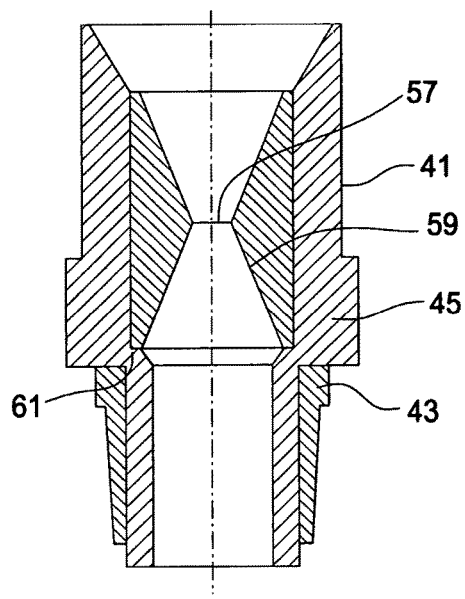

The apparatus of this invention can be automated through proper machine programming employing known techniques. For automation, metering orifice 59 should be located in funnel adapter 45 (as shown in FIG. 2, for example). Moreover, to provide proper valve operating torque and positive opening and closing from endpoint to endpoint, either the design of ball 50 as shown in the FIGURES should be customized with a slotted opening or the standard two way ball valve 50 as shown in the FIGURES should be replaced with a three way ball valve in automated embodiments, so that only the position of the non-penetrated ball side controls the opening and closing of valve 47 while penetrated ball sides are always open in dump mode. In this way, the accumulation and trapping of dry particulate material within the valve is minimized thereby maintaining proper valve functioning for automation requirements from endpoint to endpoint and assuring reliable limit switch control contact and release. Automated opening and closing of valve 47 is preferable accomplished by means of a process controlled electric rotary actuator such as available from TRIAC Corporation or others. During the opening process, the actuator turns the ball valve axis parallel to the direction of flow through the apparatus of this invention, while during the closing process the actuator turns the ball valve axis at right angle to the direction of flow.

As may be appreciated from the foregoing, improved and adaptive apparatus and methods for entraining a substance in a fluid stream are provided wherein interchangeable metering orifice inserts and interchangeable aeration and distribution inserts are utilized to control and optimize operations.

What is claimed is:

1. Apparatus connectable with a vacuum suction source for entraining a substance in a fluid stream comprising:
   a receiver for the substance having a discharge structure;
   a gravity feed substance input channel assembly receiving said receiver discharge structure at one end and having an opposite end therebelow, said assembly including a passive metering orifice therein, wherein said one end of said input channel assembly includes a receiver adapter for receiving said discharge structure of said receiver, and wherein said metering orifice is located in a first removable insert deployable in said receiver adapter;
   at least one additional metering orifice insert having at least one feature different from said first removable insert, said inserts selectively interchangeable at said receiver adapter to accommodate either or both of different metering outcomes and different physical characteristics of the substance; and
   a distribution assembly receiving said opposite end of said input channel assembly and having a fluid intake and an outlet channel connectable with the vacuum suction source for directing a fluid stream having the substance entrained therein from the apparatus.

2. The apparatus of claim 1 wherein said input channel assembly further comprises an input control valve between said ends thereof and wherein said metering orifice is located in said control valve.

3. The apparatus of claim 2 wherein said input control valve is a ball valve having a ball port and wherein said metering orifice is located in a first insert deployable in said ball port.

4. The apparatus of claim 3 further comprising at least one additional metering orifice insert having at least one feature different from said first insert, said inserts selectively interchangeable at said ball port.

5. The apparatus of claim 1 further comprising a vibrator associated with said input channel assembly.

6. The apparatus of claim 1 wherein the vacuum suction source is a cyclonic disperser having a dry material inlet suction throat and wherein said outlet channel of said distribution assembly is connectable with said inlet suction throat.

7. Apparatus connectable with a vacuum suction source for entraining particulate matter in a gas stream comprising:
a receiver for the particulate matter having an outlet;

a particulate matter input channel assembly receiving said receiver outlet at one end and having an opposite end, said assembly including a metering orifice therein; and an aeration and distribution chamber assembly receiving said opposite end of said input channel assembly at a particulate matter intake channel terminating at a chamber defined in said chamber assembly, plural discrete gas intake passageways opening into said chamber adjacent to said intake channel, and an outlet channel exiting said chamber and connectable with the vacuum suction source for directing a gas stream having the particulate matter entrained therein from the apparatus.

8. The apparatus of claim 7 wherein said aeration and distribution chamber assembly includes a first distribution insert deployed in said chamber.

9. The apparatus of claim 8 wherein said chamber assembly includes upper and lower conical sections having said distribution insert maintained therebetween.

10. The apparatus of claim 8 wherein said distribution insert includes plural discrete mass transfer openings arranged circumferentially thereabout.

11. The apparatus of claim 10 wherein said distribution insert further includes back to back conical structures with said mass transfer openings arranged thereabout.

12. The apparatus of claim 11 further comprising at least one additional distribution insert having at least one of differently configured mass transfer openings and conical structures with different angles of repose from said first distribution insert, said distribution inserts selectively interchangeable at said chamber assembly to accommodate at least one of selected mass flow rate distributions and different particulate materials.

13. The apparatus of claim 7 wherein said chamber assembly further includes a gas intake shroud in communication with said gas intake passageways and located concentrically at said particulate matter intake channel, and interchangeable differently configured intake spacers a selected one of which is located around said intake channel adjacent to said shroud to provide a gas stream having selected characteristics through said chamber assembly.

14. The apparatus of claim 7 wherein the receiver is a funnel structure, the apparatus further comprising a calibration and dump assembly including a valve associated with said outlet channel of said chamber assembly.

15. A method for entraining a substance in a fluid stream comprising the steps of:

utilizing gravity to meter the substance into a chamber having plural fluid intake passageways thereinto;

utilizing a cyclonic disperser dry material inlet to establish a vacuum suction source;

establishing a fluid stream through the passageways and the chamber by applying the vacuum suction source at the chamber;

entraining the substance in the fluid stream through discrete selectively configured mass transfer openings at the chamber; and providing the entrained substance at the dry material inlet of the disperser;

whereby at least one of selected mass flow rate distribution and different substance characteristics is selectively accommodated by the selective metering and the selective configuration of mass transfer openings.

16. The method of claim 15 further comprising the step of vibrating the substance during metering.

17. The method of claim 15 further comprising the step of distributing the substance in the chamber over a conical insert.

18. The method of claim 17 further comprising the step of arranging the passageways and the openings circumferentially about the conical insert.

* * * * *